United States Patent [19]
Wootton et al.

[11] Patent Number: 5,937,092
[45] Date of Patent: Aug. 10, 1999

[54] REJECTION OF LIGHT INTRUSION FALSE ALARMS IN A VIDEO SECURITY SYSTEM

[75] Inventors: John R. Wootton; Gary S. Waldman, both of St. Louis; Gregory L. Hobson, St. Charles, all of Mo.

[73] Assignee: Esco Electronics, St. Louis, Mich.

[21] Appl. No.: 08/772,595

[22] Filed: Dec. 23, 1996

[51] Int. Cl.⁶ .............................. G06K 9/46; H04N 7/18; G08B 13/18

[52] U.S. Cl. .......................... 382/192; 348/154; 348/155; 340/555

[58] Field of Search .................................... 382/283, 100, 382/192, 153; 348/155, 154, 145, 152, 399, 700; 340/441, 555; 250/342

[56] References Cited

U.S. PATENT DOCUMENTS

| | | | |
|---|---|---|---|
| 3,651,252 | 3/1972 | Land et al. | 348/332 |
| 4,161,750 | 7/1979 | Kamin | 348/155 |
| 4,257,063 | 3/1981 | Loughry et al. | 348/155 |
| 4,342,987 | 8/1982 | Rossin | 340/567 |
| 4,364,030 | 12/1982 | Rossin | 340/567 |
| 4,679,077 | 7/1987 | Yuasa et al. | 348/154 |
| 4,847,485 | 7/1989 | Koelsch | 340/567 |
| 4,903,009 | 2/1990 | D'Ambrosia et al. | 340/556 |
| 4,939,359 | 7/1990 | Freeman | 340/567 |
| 4,949,074 | 8/1990 | D'Ambrosia et al | 340/552 |
| 4,952,911 | 8/1990 | D'Ambrosia et al. | 340/556 |
| 4,967,183 | 10/1990 | D'Ambrosia et al. | 340/552 |
| 5,091,780 | 2/1992 | Pomerleau | 348/152 |
| 5,101,194 | 3/1992 | Sheffer | 340/567 |
| 5,253,070 | 10/1993 | Hong | 348/155 |
| 5,283,551 | 2/1994 | Guscott | 340/567 |
| 5,289,275 | 2/1994 | Ishii et al. | 348/154 |
| 5,305,390 | 4/1994 | Frey et al. | 382/115 |
| 5,398,057 | 3/1995 | Tapp | 348/154 |
| 5,422,981 | 6/1995 | Niki | 382/159 |
| 5,517,429 | 5/1996 | Harrison | 342/378 |
| 5,555,512 | 9/1996 | Imai et al. | 250/342 |
| 5,576,972 | 11/1996 | Harrison | 702/128 |

OTHER PUBLICATIONS

"Image Processing Method for Intruder Detection around Power Line Towers," Kaneta et al., IEICE Trans. Inf. & Syst., vol. E76–D No. 10, Oct. 1993.

"Detection of Intrusion using a Background Structural Model," Vannoorenberghe et al., Computers and Industrial Engineering, vol. 29, pp. 675–679, (Sep. 1995).

*Primary Examiner*—David K. Moore
*Assistant Examiner*—Wenpeng Chen
*Attorney, Agent, or Firm*—Polster, Lieder, Woodruff & Lucchesi LC

[57] ABSTRACT

This invention is a video security system (10) and a method for visually monitoring a scene and detecting motion of an intruder within the scene. A camera (C) continually views the scene and produces a representative signal. A processor (12) processes the signal and produces an image (f2) represented by the signal. This image is compared with a similar image (f1) of the scene from a previous point in time. Segments of the later image which differ from segments of the earlier image are identified. A discriminator (14) evaluates these segments to determine if the differences result simply from lighting changes, or the movement of an intruder within the scene as indicated by surface differences between segments of the respective differences. If caused by an intruder, an appropriate indication is provided. An algorithm is employed by which differences from one image to another caused by global or local lighting changes effects are identified so as not to produce false alarms.

21 Claims, 3 Drawing Sheets

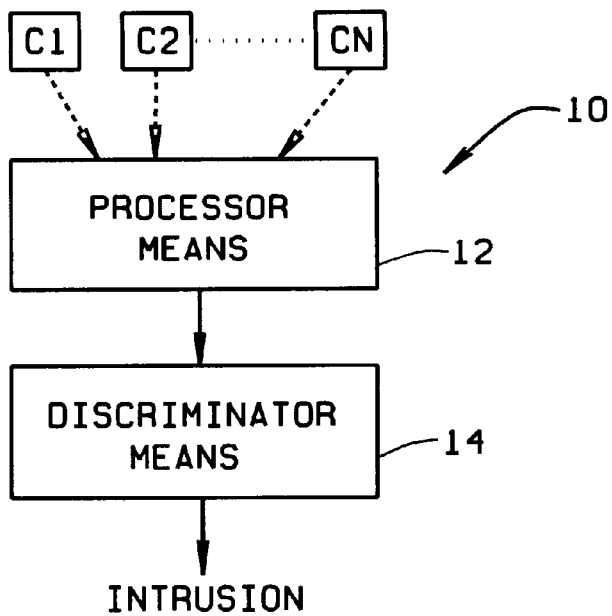
FIG. 1
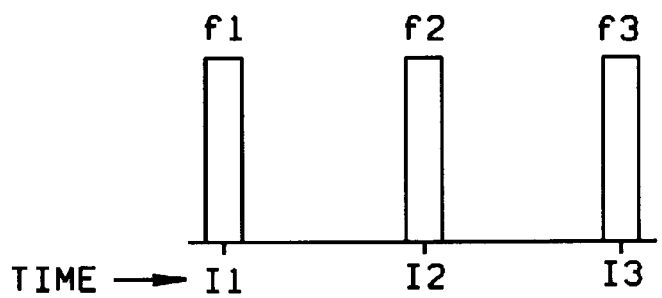
FIG. 6
$P_1$ $P_2$ $P_3$
$P_4$ $P$ $P_5$
$P_6$ $P_7$ $P_8$
FIG. 7

REJECTION OF LIGHT INTRUSION FALSE ALARMS IN A VIDEO SECURITY SYSTEM

This subject matter contained in this application is related to U.S. patent application Ser. Nos. 08/771,991, filed Dec. 23, 1996; 08/757,838, filed Nov. 27, 1996; and, 08/772,731, filed Dec. 23, 1996.

STATEMENT REGARDING FEDERALLY SPONSORED RESEARCH OR DEVELOPMENT

Not Applicable.

BACKGROUND OF THE INVENTION

This invention relates to video security systems and a method for detecting the presence of an intruder into an area being monitored by the system; and more particularly, to the rejection of false alarms which might otherwise occur because of global or local, natural or manmade lighting changes which occur within a scene observed by the system.

A security system of the invention uses a video camera as the principal sensor and processes a resulting image to determine the presence or non-presence of an intruder. The fundamental process is to establish a reference scene known, or assumed, to have no intruder(s) present. An image of the present scene, as provided by the video camera, is compared with an image of the reference scene and any differences between the two scenes are ascertained. If the contents of the two scenes are markedly different, the interpretation is that an intrusion of some kind has occurred within the scene. Once the possibility of an intrusion is evident, the system and method operate to first eliminate possible sources of false alarms, and to then classify any remaining differences as being the result of a human or non-human intrusion. This application and co-pending, co-assigned U.S. patent application Ser. No. 08/772,731 describe the identification and elimination of various sources of potential false alarms. Co-pending, co-assigned U.S. patent application Ser. No. 08/771,991 describes a classification process by which a human intruder is identified as such and an alarm given.

Processes of the type described in this and the referenced applications are particularly useful in security systems requiring video verification by a security service operator to confirm the presence of an intruder. Previously, security systems have relied upon contact break mechanisms or PID (passive infra red) motion sensors to detect intruder presence. Examples of the use of infrared devices either as a passive single element or as a scanning device, are disclosed in U.S. Pat. Nos. 5,283,551, 5,101,194, 4,967,183, 4,952,911, 4,949,074, 4,939,359, 4,903,009, 4,847,485, 4,364,030, and 4,342,987. More recently, however, the realization that an image processor is required to transmit the video for confirmation purposes has led to the development of using the image processor to actually detect the possible presence of an intruder. Such a system has an economy of hardware and obviates the need for PID sensors or contact breaker devices. A security system of this type and the referenced U.S. patent applications has comparable performance to a PID counterpart. However, there are areas where considerable benefits accrue if false alarms which occur due to the erroneous injection of light into the scene without the presence of an intruder are reduced or eliminated.

The cause of these false alarms stem from the sensor and methodology used to ascertain if an intrusion has occurred. As stated earlier, a past image of the scene being surveyed is compared with the present scene as taken from the camera. The form of comparison is essentially a subtraction of the two scenes on a pixel by pixel basis. Each pixel, however, represents a gray level measure of the scene intensity that is reflected from that part of the scene. Gray level intensity can change for a variety of reasons, the most important being a new physical presence within a particular part of the scene. Additionally, the intensity will change at that location if the overall lighting of the total scene changes (a global change), or the lighting at this particular part of the scene changes (a local change), or the AGC (automatic gain control) of the camera changes, or the ALC (automatic light level) of the camera changes. With respect to global or local lighting changes, these can result from natural lighting changes or manmade lighting changes. Finally, there will be a difference of gray level intensity at a pixel level if there is noise present in the video. Only the situation of a physical presence in the scene is a true alarm; the remainder all comprise false alarms within the system. For a security system to be economically viable and avoid an unduly high load on an operator who has to verify each alarm, the system must process images in a manner which eliminates as many of false alarms as possible without impacting the overall probability of detecting the presence of an intruder.

Earlier efforts have been made in detecting the presence of a person in a scene using a video system. In U.S. Pat. No. 4,697,077, a camera is used to view a scene. An original reference image of the scene is prestored and a frame to frame subtraction process is employed to detect the presence of an object (an anomaly). Once an anomaly is detected, the system automatically transmits any differences, provided they are large enough, to another location over a telephone line. At this location, the image is reviewed by a human. While this patent teaches detection, it does not attempt to use image processing to recognize an anomaly as caused by a human presence or any other source.

U.S. Pat. No. 4,257,063, teaches that a video line from a camera can be compared to the same video line produced at an earlier time to detect the presence of a human. However, what is reviewed is not a whole image, nor is any compensation made for changes in light, nor is any attempt made to automatically recognize the contents of the image as being derived from a human. Similarly, U.S. Pat. No. 4,161,750, teaches that changes in the average value of a video line can be used to detect the presence of an anomalous object.

Overall, the relevant art, while generally teaching some type of detection, does not address the use of image processing as an automatic recognition stage to prevent false alarms, nor the use of image processing to distinguish between a global or local change in lighting caused, for example, by a lightning flash, building lights going on or off, or a flash light being shone over the scene, and the actual presence of an intruder in the scene. As compared to method of the present invention, what these systems produce would, in many instances be false alarms. It therefore will be appreciated that a need exists for a method of removing unwanted detections due to sudden changes in lighting conditions both globally throughout the scene or locally within the scene, whether this change in lighting is positive or negative, temporary or permanent. The system and method of the present invention fulfills this need.

BRIEF SUMMARY OF THE INVENTION

Among the several objects of the present invention may be noted the provision a video security system and method for visually monitoring a scene and detecting the presence of an intruder within the scene;

the provision of such a system and method to readily distinguish between changes within the scene caused by the presence of a person entering the scene as opposed to changes within the scene resulting from inadvertent or deliberate lighting changes which occur within the scene;

the provision of such a system and method which provides an indication to a person supervising the operation of the video security system only when the presence of an intruder is sensed, and not to generate false alarms in response to changes only caused by lighting changes;

the provision of such a system and method which does not produce an intruder indication in response to local lighting changes caused, for example, by such things as someone shining a flashlight on the scene;

the provision of such a system and method which further does not produce an intruder indication in response to global lighting changes resulting from movement of the sun or clouds, changes in artificial lighting such as occurs when ceiling lights or lamps are turned on or off, outside lights shining through a window onto the scene change, or there are sudden lighting changes due to vehicle headlamps being shone through a window onto the scene;

the provision of such a video security system to employ a camera system operating in the visible or infrared portion of the light spectrum;

the provision of a such system and method in which the scene is viewed on a continuous or repetitious basis;

the provision of such a system and method in which the most recent image of the scene is compared with a previous image or images of the scene, the result of the comparison determining if further processing of the image is required;

the provision of such a method to identify those pixel values within a scene which differ from the values of corresponding pixels in the a previous scene as an indication of a change within the scene;

the provision of such a method to further establish thresholds for changes in pixel values and discriminate between significant and non-significant changes based upon the whether or not any changes exceed threshold levels;

the provision of such a method to identify within the scene those areas in which local lighting changes normally occur and to normally disregard changes which occur within those areas, but to also investigate those areas if the image processing indicates such investigation is warranted;

the provision of such a video security system and method to respond to surface differences which occur in a scene rather than lighting changes which occur therewithin in order to detect the presence of an intruder in the scene;

the provision of such a system and method to employ detection, antialiasing, region grower segmentation, noise removal, and masking algorithms in detecting the presence of an intruder; and, the provision of such a system and method to quickly and reliably determine the presence of an intruder, and to provide an economical system by which a number of areas can be continuously monitored from a central location without requiring a large number of security personnel to either patrol the areas or man the monitoring location.

In accordance with the invention, generally stated, a video security system visually monitors a scene to detect motion of an object (an intruder) within the scene. A camera continually views the scene and producing a signal representative of the scene. A processor processes the signal to produce an image represented by the signal and compares the image representing the scene at one point in time with a similar image of the scene at a previous point in time. Those segments of the image which differ from segments of the earlier image are identified. A discriminator evaluates those segments to determine if the differences are caused by a change in lighting within the scene, or the movement of an intruder within the scene. If a difference is caused by an intruder, an appropriate indication is provided. The system employs an algorithm by which differences from one image to another caused by global or local lighting changes, the effects of motion of objects established within the scene, noise, and aliasing effects are identified so as not to produce false alarms. A method of intruder detection is also disclosed. Other objects and features will be in part apparent and in part pointed out hereinafter.

BRIEF DESCRIPTION OF THE SEVERAL VIEWS OF THE DRAWINGS

In the drawings,

FIG. 1 is a simplified block diagram of a video security system of the present invention for viewing a scene and determining the presence of an intruder in the scene;

FIG. 6 is a simplified time line indicating intervals at which images of the scene are viewed by the camera system; and, FIG. 7 represents a pixel array such as forms a portion of an image.

Corresponding reference numerals represent corresponding parts throughout the several views of the drawings.

DESCRIPTION OF A PREFERRED EMBODIMENT

Figure 2:
FIG. 2 is a representation of an actual scene viewed by a camera system of the video security system.

Referring to the drawings, a video security system or apparatus is indicated generally 10 in FIG. 1. The system employs one or more cameras C1–Cn each of which continually views a respective scene and produces a signal representative of the scene. The cameras may operate in the visual or infrared portions of the light spectrum and a video output signal of each camera is supplied to a processor means 12. Means 12 processes each received signal from a camera to produce an image represented by the signal and compares the image representing the scene at one point in time with a similar image of the scene at a previous point in time. The signal from the imaging means represented by the cameras may be either an analog or digital signal, and processing means 12 may be an analog, digital, or hybrid processor.

Figure 3:
FIG. 3 is the same scene as FIG. 2 but with the presence of an intruder.

Referring to FIG. 2, an image of a scene is shown, the representation being the actual image produced by the apparatus. FIG. 2 represents, for example, a reference image of the scene. FIG. 3 is an image exactly the same as that in FIG. 2 except that now a person (intruder) has been introduced into the scene. The purpose of the apparatus and method of the invention is to identify the presence of the intruder and provide an appropriate alarm. However, it is a main feature of the invention to not produce false alarms. As described herein, there a numerous sources of potential false alarms and using an algorithm employed by the invention, these sources are identified for what they are so that a false alarm does not result.

Potential sources of false alarms which the system and method of this application identifies include global and local lighting changes within a scene, whether naturally occurring or caused by human actions. Identifying other sources of potential false alarms such as noise on a video signal, aliasing effects, and fixed objects within the scene which have an associated movement are discussed in co-pending U.S. patent application Ser. No. 08/772,731, filed Dec. 23, 1996.

Figure 4:
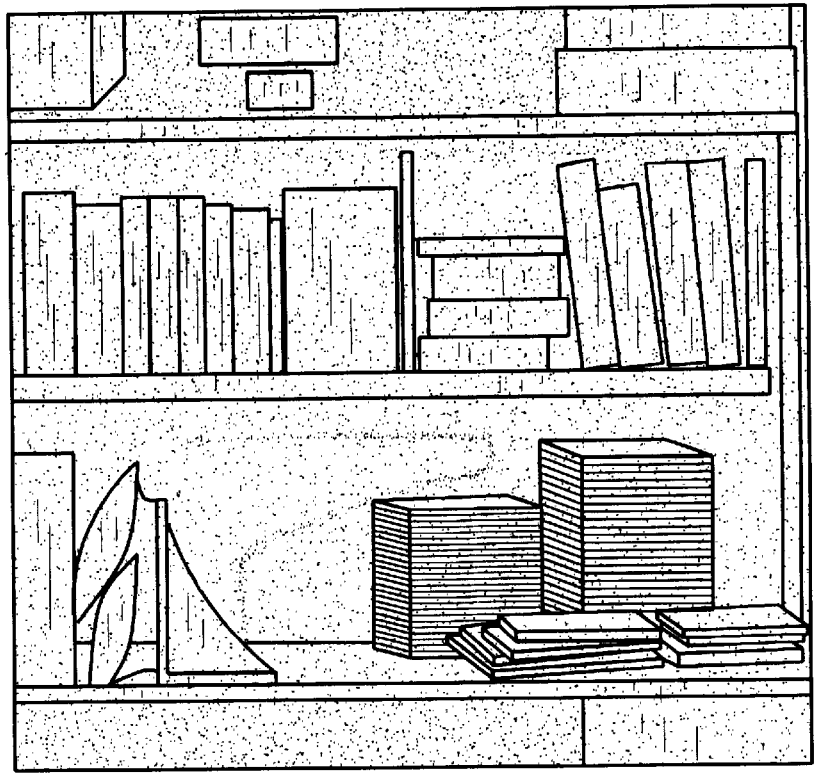
FIG. 4 is a representation of another actual scene under one lighting condition.
Figure 5:
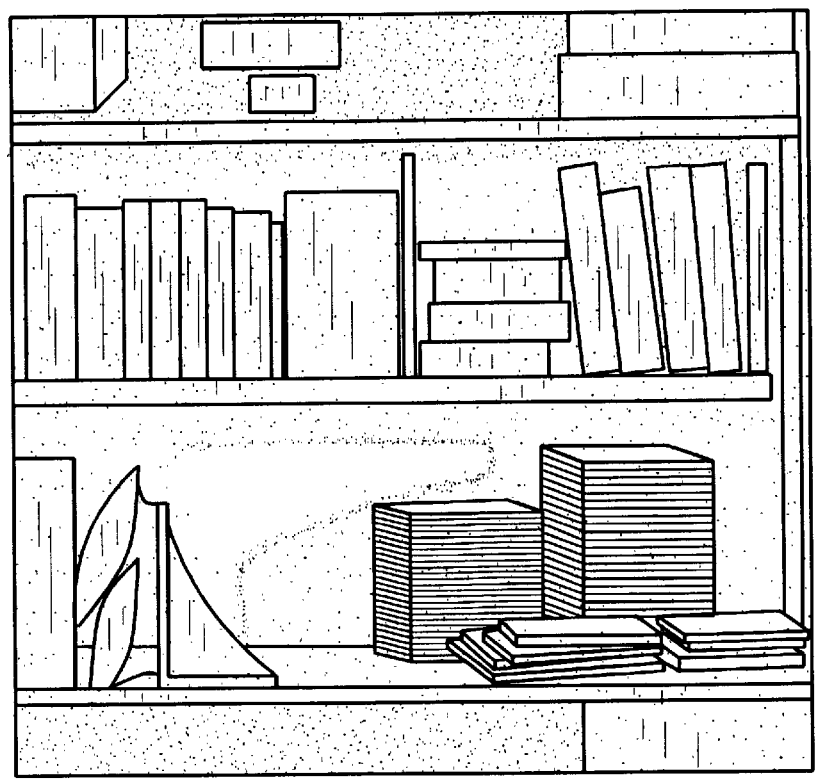
FIG. 5 is a representation of the same scene under different lighting conditions and with no intruder in the scene.

Referring to FIGS. 4 and 5, these Figs. again represent actual images of a scene produced by a camera of the video security system. In FIG. 4, the scene is shown with one set of lighting conditions. In FIG. 5, a flashlight beam has been shone on the scene which causes significant changes in the lighting within the scene. However, no intruder has entered the scene. The present invention identifies the changes in the scene of FIG. 5 with respect to the reference image of FIG. 4. It further identifies the change as not being caused by an intruder and therefore does not produce an alarm. In addition to the lighting change between the images, the system and method of the invention identifies non-intruder motion occurring within the scene so as to not provide a false alarm because of that either.

Operation of the system and method of the invention are such that segments of an image (FIG. 3, FIG. 5) which differ from segments of an earlier image (FIG. 2, FIG. 4) are identified. A discriminator means 14 evaluates those segments to determine if the differences are caused by a lighting change within the scene (FIG. 5), or the movement of an intruder within the scene (FIG. 3). As noted, if the change is caused by an intruder, an alarm is given. But, if the differences result from global or local lighting changes, the effects of motion of objects established within the scene, noise, and aliasing effects, these are recognized as such so a false alarm is not given.

Any video alert system which uses frame-to-frame changes in the video to detect intrusions into a secured area is vulnerable to false alarms from the inadvertent (passing automobile lights, etc.) or deliberate (police or security guard flashlights) introduction of light into the area, even though no one has physically entered the area. The apparatus and method of the present invention is be able to differentiate between a change in a video frame due to a change in the irradiation of the surfaces in the FOV (field of view), and a change due to the introduction of a new reflecting surface in the FOV. Using the apparatus and method of the invention, the former is then rejected as a light "intrusion" requiring no alarm, whereas the latter may be identified as an intruder into the scene and result in an alarm being given. One way to achieve the desired discrimination is to use an elaboration of the retinex theory introduced by Edwin Land some 25 years ago.

Land's theory was introduced to explain why human observers are readily able to identify differences in surface lightness despite greatly varying illumination across a scene. Although the following discussion is with regards to a human observer, it will be understood that besides human vision, Land's theory is also applicable to viewing systems which function in place of a human viewer. According to the theory, even if the amount of energy reflected (incident energy times surface reflectance) from two different surfaces is the same, an observer can detect differences in the two surface lightness' if such a difference exists. In other words, the human visual system has a remarkable ability to see surface differences and ignore lighting differences. Land's hypothesis was that this ability derives from comparison of received energies across boundaries in the scene. Right at any boundary, light gradients make no difference because the energies received from adjacent regions on opposite sides of a boundary are in the correct ratio (the same as the ratio of reflectances). Furthermore, correct judgments about lightness' of widely separated regions are made by a serial process of comparisons across intervening regions. At first the theory was applied only to black and white scenes. Subsequently, it was extended to color vision by assuming that three separate retinex systems judge the lightness of surfaces in the three primary colors (red, green and blue). The retinex theory of color vision is able to explain why surface colors appear very stable to humans even though the nature of the illumination may change through a wide range.

It is the ability to discern surface differences and ignore lighting changes which is incorporated into the video security system and method of the present invention. Therefore, whether or not Land's theory correctly explains the way human vision operates, use of his concepts in the present invention make the system and method immune to light "intrusions".

A video signal (gray level) for any pixel is given by $$g \int E(\lambda) r(\lambda) S(\lambda) d\lambda \tag{1}$$

where
  $E(\lambda)$=scene spectral irradiance at the pixel in question
  $r(\lambda)$=scene spectral reflectance at the pixel in question
  $S(\lambda)$=sensor spectral response
The constant of proportionality in (1) depends on geometry and camera characteristics, but is basically the same for all pixels in the frame.

The ratio of video signals for two adjacent pixels is:

$$\frac{g_1}{g_2} = \frac{\int E_1(\lambda) r_1(\lambda) S(\lambda) d\lambda}{\int E_2(\lambda) r_2(\lambda) S(\lambda) d\lambda} = \frac{\int E(\lambda) r_1(\lambda) S(\lambda) d\lambda}{\int E(\lambda) r_2(\lambda) S(\lambda) d\lambda}$$

where we have used Land's approximation that the scene irradiance does not vary significantly between adjacent pixels: $E_1(\lambda) \equiv E_2(\lambda) \equiv E(\lambda)$. Assuming that the spectral reflectances are nearly constant over the spectral response of the camera, then $r_K(\lambda) \equiv r_K = 1,2$ and $$\frac{g_1}{g_2} \equiv \frac{r_1}{r_2} \frac{\int E(\lambda) S(\lambda) d\lambda}{\int E(\lambda) S(\lambda) d\lambda} = \frac{r_1}{r_2} \tag{3}$$

In other words, for the conditions specified, ratios of adjacent pixel values satisfy the requirement of being determined by scene reflectances only and are independent of scene illumination. It remains to consider the practicality of the approximations used to arrive at (3). A basic assumption in the retinex process is that of only gradual spatial variations in the scene irradiance; that is, we must have nearly the same irradiance of adjacent pixel areas in the scene. This assumption is generally true for diffuse lighting, but for directional sources it may not be. For example, the intrusion of a light beam into the area being viewed can introduce rather sharp shadows, or change the amount of light striking a vertical surface without similarly changing the amount of light striking an adjacent tilted surface. In these instances, ratios between pixels straddling the shadow line in the first instance, or the surfaces in the second instance, will change even though no object has been introduced into the scene. However, even in these cases, with 512 by 484 resolution, the pixel-to-pixel change is often less than it appears to the eye, and the changes only appear at the boundaries, not within the interiors of the shadows or surfaces. By establishing a threshold on hits, the system can tolerate a number of these hits without triggering an intrusion alarm.

Another method, based on edge mapping, is also possible. As in the previous situation, the edge mapping process would be employed after an initial detection stage is triggered by pixel value changes from one frame to the next. Within each detected "blob" area, an edge map is made for both the initial (unchanged) frame and the changed frame that triggered the alert. Such an edge map can be constructed by running an edge enhancement filter (such as a Sobel filter) and then thresholding. If the intrusion is just a light change, then the edges within the blob should be basically in the same place in both frames. However, if the intrusion is an object, then some edges from the initial frame will be obscured in the changed frame and some new edges, internal to the intruding object, will be introduced.

Extensive laboratory testing revealed problems with both methods. In particular, it is difficult to set effective thresholds with the retinex method, because with a background and intrusive object both containing large uniform areas, many adjacent pixel ratios of unity in both the reference frame and the new frame are obtained. Therefore the fraction of ratios that are changed is diluted by those which contribute no information one way or the other. On the other hand, the edge mapping method shows undue dependence on light changes because typical edge masks use absolute differences in pixel values. Light changes can cause new edges to appear, or old ones to disappear, in a binary edge map even through there is no intervening object. By exploiting concepts from both methods, and key to this invention, an algorithm having both good detection and false alarm performance characteristics has been constructed. Additional system features also help eliminate light changes of certain types which are expected to occur, so to further enhance performance.

Generally, a single processor can handle several cameras positioned at different locations within a protected site. In use, the processor will cycle through the different cameras, visiting each at approximately one-half second intervals. At power-up, the processor cycles through all of the cameras doing a self-test on each. One important test at this time is to record a reference frame against which later frames will be compared. A histogram of pixel values is formed from this reference frame. If the histogram is too narrow, a message is sent to the effect that this camera is obscured and will not used. This procedure is meant to guard against the possibility of someone obscuring the camera while it is off by physically blocking the lens with an object or by spray-painting it. If the camera is so obscured, then all the pixel values will be very nearly the same and this will show up in the histogram. Although the camera is now prevented from participating in the security system, at least the system operator will be made aware that something is amiss at that particular location.

In accordance with the method, a reference frame f1 is created. At each subsequent visit to the camera a new frame f2 is produced and subtracted from the reference frame. If the resulting differences are not significant, the system proceeds on to the next camera. However, if there is a significant difference, frame f2 is stored and a third frame f3 is created on the next visit and compared to both frames f1 and f2. Only if there is a significant difference between frames f3 and f2 and also frames f3 and f1, is further processing done. This three frame procedure eliminates false alarms resulting from sudden light changes caused by lightning flashes or interior lights within the monitored area going on or off. A lightning flash during frame f2 will be gone by frame f3, so there will be no significant difference between frames f3 and f1. On the other hand, if the interior lights have simply gone on or off between frames f1 and f2, there will be no significant changes between frames f2 and f3. In either case, the system proceeds on to the next camera with no more processing being done with respect to these particular frames.

Significant differences between frames f1 and f2, frames f3 and f2, and frames f3 and f1 indicate a possible intrusion requiring more processing. The next step of the method is designed to reject a variable light change such as caused by a security guard's flashlight or a passing vehicle headlights moving through the camera's FOV. Either of these occurrences would also require no further action.

The basic premise of the variable light rejection algorithm used in the method of the invention is to compare ratios of adjacent pixels from a segmented area in frame f1 with ratios from corresponding pixels in frame f3, but to restrict the ratios to those across significant edges. Restricting the processing to ratios of pixels tends to reject illumination changes, and using only edge pixels eliminates the dilution of information caused by large uniform areas.

In implementing the algorithm,
a) Ratios R of adjacent pixels (both horizontally and vertically) in frame f1 are tested to determine if they significantly differ from unity: $R-1>T_1$? or $(1/R)-1>T_1$?, where $T_1$ is a predetermined threshold value. Every time such a significant edge pair is found an edge count value is incremented.
b) Those pixel pairs that pass either of the tests in a) have their corresponding ratios R' for frame f3 calculated.
c) A check is made to see if R' differs significantly from the corresponding ratio R:$|R'-R|/R>T_2$?, where $T_2$ is a second predetermined threshold value. Each time this test is passed a hit count value is incremented.
d) A test is made for new edges in frame f3 (i.e., edges not in frame f1): $R'-1>T_1$? or $(1/R')-1>T_1$? Every time such a new significant edge pair is found the edge count value is incremented again.
e) Those pixel pairs that pass either of the tests in d) have their corresponding ratios from frame f1, R, calculated.
f) A check is made to see if ratio R' differs significantly from the corresponding ratio R:$|R'-R|/R>T_2$? Each time this test is passed the hit count value is incremented again.
g) The segmented area is now deemed an intrusion if the ratio of changed edges to the edge count value (ecv) is sufficiently large: that is, there is an intrusion if $H/ecv>T_3$, where $T_3$ is a third predetermined threshold value.

It is important to remember that only the detection of the presence of a human intruder is of consequence to a security system, the rest constitutes a false alarm. It is the capability of the video security system and method of the present invention to yield a high probability of detection of the presence of a human, while having a low probability of false alarms which constitutes a technically differentiated video security system. By identifying the effects of lighting changes within a scene whether global or local, naturally caused or manmade, as described hereinabove, anomalies which arise between images of the same scene viewed at different times can be accounted for so that a false alarm is not given because of these effects. By making the security system resilient to local and global lighting changes the probability of detecting a human presence and disregarding other effects is greatly increased.

In view of the above, it will be seen that the several objects and advantages of the present invention have been achieved and other advantageous results have been obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. A video security system visually monitoring a scene and detecting motion of an object within the scene comprising:

imaging means continually viewing the scene and producing a signal representative of the scene;

processor means processing said signal, comparing the signal representing the scene at one point in time with a similar signal representing the scene at a previous point in time, and identifying those segments of the scene at said point in time which differs from segments of the scene at the earlier point in time;

discriminator means evaluating those segments of the scene identified as being different to determine if the differences are caused by surface differences which are indicative of the presence of an intruder within the scene, or lighting changes which occur within the scene and do not indicate the presence of an intruder, if the difference is caused by the presence of an intruder providing an indication thereof;

said discriminator means including means comparing pixel elements contained in each segment of the scene at one point in time and corresponding pixel elements contained in a corresponding segment from the scene at an earlier point in time; and said discriminator means determining a ratio of light intensity between each pixel in a segment with each pixel adjacent thereto, and means comparing the ratio values for the pixels in the segment of the scene at one point in time with the ratio values for the pixels in the corresponding segment of the scene at the earlier point in time.

2. The video security system of claim 1 wherein said imaging means comprises a camera capable of producing an image of a scene.

3. The video security system of claim 2 wherein said camera is a television camera operating in the visible portion of the light spectrum.

4. The video security system of claim 2 wherein said camera is an infrared camera operating in the infrared portion of the light spectrum.

5. The video security system of claim 1 wherein the output from said imaging means is an analog signal and said processing means is an analog processor.

6. The video security system of claim 1 wherein the output from said imaging means is a digital signal and said processing means is a digital processor.

7. The video security system of claim 1 wherein said processor means comprises a hybrid processor.

8. The video security system of claim 1 wherein said discriminator means further includes threshold means determining if a computed ratio for one pixel and an adjacent pixel in the segment of the scene at the one point in time varies by a predetermined threshold value from the computed ratio for the corresponding pixels in the scene segment at the earlier point in time.

9. The video security system of claim 8 wherein said discriminator means further includes a second threshold means determining the number of computed ratios for said pixel elements in the scene at the one point in time which exceed the predetermined value, the number of computed ratios, if exceeding a second threshold value, indicating that the difference between the scenes at the separate points in time are the result of the presence of an intruder in the scene.

10. A method of determining the presence of an object in a scene comprising:

continuously viewing the scene and developing a signal representative of the scene at different points in time;

processing each signal representing the scene, processing of said signal including comparing the signal representing the scene at one point in time with a signal representing the scene at a previous point in time, and identifying those segments of the scene at the later time which differ from segments of the scene at the earlier time, by determining the ratio of the gray level of adjacent pixels representing an area of interest within the scene, and counting the number of occurrences in which the ratio exceeds a predetermined value; and evaluating those scene segments identified as being different to determine if the differences are caused by surface differences which are indicative of the presence of an intruder within the scene, or lighting changes which occur within the scene and do not indicate the presence of an intruder.

11. The method of claim 10 wherein if a difference in the scene is caused by the movement of an object into the scene rather than a change in lighting, an indication thereof is provided.

12. The method of claim 11 wherein evaluating the causes of differences in segments of the scene includes identifying differences resulting from light intrusions into the scene.

13. The method of claim 12 wherein evaluating the differences resulting from light intrusions includes identifying global lighting changes within the scene.

14. The method of claim 13 wherein evaluating the differences resulting from light intrusions includes identifying local lighting changes within the scene.

15. The method of claim 10 further including determining if the count value for the number of occurrences exceeds a threshold value and performing a further evaluation if the threshold value is exceeded.

16. The method of claim 10 wherein identifying those segments of the scene which differ includes constructing an edge map for both the earlier and the later viewing of the scene and determining if the resulting edges are substantially the same in each viewing, whereby if the differences are substantially the same, the differences between the segments is the result of lighting changes and further evaluation is not required, but if the differences are not substantially the same, further evaluation is performed.

17. A method of determining the presence of an object in a scene comprising:

continuously viewing the scene and developing a signal representative of the scene at different points in time;

processing each signal representing the scene, processing of said signal including comparing the signal representing the scene at one point in time with a signal representing the scene at a previous point in time, and identifying those segments of the scene at the later time which differ from segments of the scene at the earlier time;

evaluating those scene segments identified as being different to determine if the differences are caused by surface difference which are indicative of the presence of an intruder within the scene, or lighting changes which occur within the scene and do not indicate the presence of an intruder; and wherein identifying segments of the scene which differ from one time to another includes (a) calculating the ratios of adjacent pairs of pixels in a first frame representing an image of the scene at one point in time to determine if a ratio for a pixel pair differs by an amount exceeding a first threshold level, and incrementing a first count value each time the first threshold level is exceeded;

(b) calculating the ratios for corresponding pixel pairs in a second frame representing an image of the scene at another point in time for those pixel pairs in the first frame whose ratio exceeds the first threshold value;

(c) determining if a calculated ratio for a corresponding pixel pair in the second frame differs from the calculated ratio for the pixel pair in the first frame by an amount exceeding a second threshold value, and incrementing a second count value each time the second threshold level is exceeded; calculating the ratio of adjacent pixels for any edge of a segment which appears in the second frame but not the first frame to determine if a ratio for a pixel pair differs by an amount exceeding the first threshold level, and incrementing the first count value each time the first threshold level is exceeded;

(d) calculating the ratios for corresponding pixel pairs in the first frame if the ratios for the pixel pairs in the second frame at said edge of a segment which exceeds the first threshold value;

(e) determining if a calculated ratio for a corresponding pixel pair in the first frame differs from the calculated ratio for the pixel pair in the second frame at said edge of a segment by an amount exceeding the second threshold value, and incrementing the second count value each time the second threshold level is exceeded; and (f) identifying the segment as an intrusion if the ratio of the second count value to the first count value exceeds a third predetermined threshold value.

18. A method for discriminating an intrusion in a scene from changes in lighting of said scene comprising:

viewing said scene at a first point in time and developing an image signal representative of said scene at said first point in time;

viewing said scene at a second, later point in time, developing a second image signal representative of said scene at said second point in time;

comparing said first and second image signals and obtaining a set of differences, if any, between the two image signals;

responding to said set of differences exceeding a threshold by viewing said scene at a third, and still later point in time, and developing a third image signal representative of said scene at said third point in time;

comparing said first and third image signals to produce a second set of differences;

comparing said second and third image signals to produce a third set of differences; and responding to said second and third sets of differences exceeding said threshold, evaluation of said first and third image signals being performed to determine if any differences between the respective image signals result from changes in the irradiation of surfaces in the scene caused by changes in global lighting of said scene, said differences, if not a result of changes in the irradiation of surfaces, being due to the introduction of a new reflecting surface into said scene.

19. The method of claim 18 for discriminating an intrusion in a scene from changes in lighting of said scene wherein evaluating said first and third image signals to reject local illumination changes in said scene includes:

identifying pixels representing edges in said first image signal;

counting said identified edge pixels;

comparing ratios of reflectance of adjacent pixels representing edges in said first image signal with ratios of reflectance for corresponding pixels in said third image signal;

counting said compared ratios of reflectance exceeding a threshold value; identifying pixels in said third image signal representing new edges in said third image signal not present in said first image signal;

incrementing said count of identified edge pixels by the number of edge pixels identified in said third image signal;

comparing ratios of reflectance of adjacent pixels representing new edges in said third image signal with ratios of reflectance for corresponding pixels in said first image signal;

incrementing said count of compared ratios of reflectance exceeding said threshold value by the number of compared ratios of reflectance between said third and first image signals exceeding said threshold value; and responding to a ratio of said count of compared ratios of reflectance to said count of identified edge pixels exceeding a second threshold value, to provide an indication of an intrusion into said scene.

20. The method of claim 19 wherein the steps of identifying edge pixels and comparing ratios of reflectance are performed only on segmented portions of said first and third image signals corresponding to said second set of differences between said first and third signals.

21. The method of claim 19 wherein the steps of identifying edge pixels in said first image signal and identifying new edge pixels in said third image signal further include:

comparing the reflectance of horizontally and vertically adjacent pixels to determine if the ratio of reflectance differs from unity by a predetermined amount; and classifying said adjacent pixels as a edge pixels if said ratio of reflectance exceeds said predetermined amount.

* * * * *